United States Patent
Banks et al.

(12)

(10) Patent No.: US 6,470,298 B1
(45) Date of Patent: Oct. 22, 2002

(54) APPARATUS AND METHOD FOR PROBABILISTIC POPULATION SIZE AND OVERLAP DETERMINATION

(75) Inventors: Steven M. Banks, Berne, NY (US); John A. Pandiani, Bristol, VT (US)

(73) Assignee: The Bristol Observatory, LTD, Bristol, VT (US)

(*) Notice: Subject to any disclaimer, the term of this patent is extended or adjusted under 35 U.S.C. 154(b) by 816 days.

(21) Appl. No.: 08/795,706

(22) Filed: Feb. 4, 1997

(51) Int. Cl.[7] .............................................. G06F 15/00
(52) U.S. Cl. .......................................... 702/181; 707/3
(58) Field of Search ......................... 364/554; 395/202, 395/601, 602, 616; 705/3, 7, 10, 14; 707/3; 702/179, 181

(56) References Cited

U.S. PATENT DOCUMENTS

| | | | | |
|---|---|---|---|---|
| 5,187,673 A | | 2/1993 | Carver, Jr. et al. | 364/555 |
| 5,539,752 A | * | 7/1996 | Berezin et al. | 371/22.1 |
| 5,634,049 A | * | 5/1997 | Pitkin | 395/613 |
| 5,659,731 A | | 8/1997 | Gustafson | 395/604 |
| 6,056,690 A | * | 5/2000 | Roberts | 600/300 |
| 6,059,724 A | * | 5/2000 | Campell et al. | 600/300 |
| 6,360,184 B1 | * | 3/2002 | Jacquez | 702/181 |
| 2001/0069620 | * | 12/2001 | Blasko | 705/10 |

OTHER PUBLICATIONS

Nomura, "Effective Size of Selected Populations with Overlapping Generations", J. Anim. Breed. Genet., 1996.*

Atlas et al., "Comparative–Evaluation of Two Superior Stopping Rules for Hierarchical Cluster–Analysis", Psychometrika, 1994.*

Houle et al., "Project on Matching Census 1986 Database and Manitoba Health Care Files: Private Households Component", Mar. 1996.*

Bell et al., "Matching Records in a National Medical Patient Index", Sep. 2001.*

Feller, William, *An Introduction to Probability Theory and Its Applications,* vol. 1, Second Edition, John Wiley & Sons, New York, (1957) pp. 210–211 and 224.

Abeni D.A., Brancato, G., and Perucci, C.A. "Capture–Recapture to Estimate the Size of the Population with Human Immunodeficiency Virus Type 1 Infection." *Epidemiology,* vol. 5, No. 4 (Jul. 1994), pp. 410–414.

Larsen, S.O. "Estimation of the Number of People in a Register from the Number of Birthdates." *Statistics in Medicine.* vol. 13 (1994) pp. 177–183.

* cited by examiner

*Primary Examiner*—Patrick Assouad
(74) *Attorney, Agent, or Firm*—Staas & Halsey LLP (57) ABSTRACT

The invention is an apparatus and method for probabilistic determination of population size and population overlap in data containing records on the unique entities without unique identifiers for the unique entities and having at least one common type of information with a known distribution of finite expectation. A computer determines population size by decomposing probabilistic calculations which include calculating a first probabilistic number of unique entities needed to satisfy a first value of the information with the known distribution, successively calculating a probabilistic incremental number of unique entities needed for a previous value of the information with the known distribution to increase to a subsequent value of the information with the known distribution, until the probabilistic number of unique entities needed to increase to a predetermined value of the information with the known distribution is calculated, and summing the first probabilistic number of unique entities and the probabilistic incremental numbers of unique entities. The computer determines population overlap of unique entities between first and second data sets by subtracting a probabilistic incremental number of unique entities needed for a larger total number of values of the information with the known distribution from either of the first and second data sets to increase to a total number of values of the information with the known distribution in the combined data set from a smaller of the population size of the first and second data sets.

24 Claims, 6 Drawing Sheets

Microfiche Appendix Included
(1 Microfiche, 14 Pages)

APPARATUS AND METHOD FOR PROBABILISTIC POPULATION SIZE AND OVERLAP DETERMINATION

REFERENCE TO MICROFICHE APPENDIX

A computer source code listing containing a preferred embodiment of the present invention is included in a microfiche appendix, appended hereto, having one microfiche and fourteen frames.

BACKGROUND OF THE INVENTION

1. Field of the Invention

The present invention relates to an apparatus and method for determining population size and overlap within information sources. More specifically, the present invention relates to a statistical technique for measuring population overlap without reliance on unique identifiers, and provides an alternative and superior method for determining population size.

2. Description of the Related Art

Government and private industry need to know the number of people who are involved in more than one institution, program, group, or activity, either concurrently or in sequence for purposes of management, monitoring, and evaluation.

The measurement of population overlap has been hampered by both the complexity of the social institutions and the lack of unique personal identifiers across existing data sets. Until now, the determination of the number of individuals shared across sub-populations has relied on one or more of three approaches to the problem: (1) the construction of detailed case registries (single data sets); (2) implementation of a true unique id system (e.g. National ID card) across multiple data sets; and (3) case by case matching of records from multiple data sets that describe the members and/or activities of various organizations and service sectors.

Traditionally, the problem of data set overlap has been most commonly approached by the development of case registries. The Gulf War Registry, designed to allow medical researchers to determine the prevalence and distribution of Gulf War Syndrome is one current example. The National Breast Cancer Registry is another. In the 1960s, a number of states established psychiatric case registries in order to determine the prevalence and distribution of mental illness. In every case the problem was the same. Existing fragmented information systems could not support the critical epidemiological functions of determining the relationship among existing data sets. There are three important shortcomings to this approach. First, the creation of case registries is a very expensive undertaking. Second, the completeness of a registry is always in question, especially when participation is voluntary. The incompleteness of the Gulf War Registry is notorious. Finally, because they necessarily include personal identifiers, the creation of case registries raises important issues about personal privacy and confidentiality of personal records.

The implementation of universal true unique personal identifier systems provides a second solution to the problem of determining the number of people involved in different subpopulations. While the implementation of such identification systems has been successfully accomplished for specific organizations (e.g. individual hospitals, correctional facilities, and insurance companies), these identification systems do not constitute the kind of universal identification systems that allow for analysis of membership overlap. In the United States, the social security number comes close to providing a universal identification system, but concerns about personal privacy severely limit the availability of these identifiers in settings not directly related to the social security system.

Case by case matching of records from multiple data sets based on the names of people or other identifiers that may be shared by more than one data set is a third approach to the problem. Case by case database integration on a patient specific basis has been utilized in a number of fields. From a practical point of view, this approach is has two major shortcomings. First, it is tedious, time consuming, and expensive. Second, it includes an unquantifiable degree of error. This approach also depends on personal identifiers, so concerns about privacy and confidentiality are likely to limit its utilization.

The problem of measuring the overlap between populations where no unique person identifier exists is related to the problem of measuring population size (the number of distinct individuals) without a unique person identifier. The problem of estimating population size may, in fact, be seen as a constituent part of the larger problem of estimating population overlap. In the past, the measurement of the number of people represented in a single data set that does not include a unique person identifier has relied on either of two statistical approaches. One statistical approach applies the capture-recapture sampling technique to the problem. This approach is illustrated by Abeni et al., "Capture-Recapture to Estimate the Size of the Population with Human Immunodeficiency Virus Type 1 Infection," *Epidemiology,* Volume 5 Number 4, July 1994 (pp. 410–414). The other statistical technique is based on a classical occupancy theory, as discussed by Feller, "An Introduction to Probability Theory and Its Applications," Volume 1, Second Edition, 1957. The classical occupancy theory is described on pages 210–211 and 224 of Feller's text. One implementation of the classical occupancy theory has been provided by Larsen, "Estimation of the Number of People in a Register from the Number of Birthdates," *Statistics in Medicine,* Volume 13, 1994 (pp. 177–183). The present invention uses a fundamentally different, and far superior, implementation of the classical occupancy theory.

The capture-recapture technique is, in essence, case by case matching of small samples of larger populations. It avoids the cost associated with complete case by case matching, but still raises issues of personal privacy and confidentiality because it relies on personal identifiers for a subset of the population. Capture-recapture was originally developed by ecologists to estimate the size of wildlife populations. In the simplest setting, a sample of wildlife is captured, tagged, and released. At a later time, a second sample is drawn and overlap with the first sample is determined. The sizes of the two samples and their overlap are used to statistically determine the size of the total population and the confidence interval associated with the estimate. In applications to human populations, capture-recapture draws samples from lists of members of subpopulations. Personal identifiers are used to measure overlap of the samples and statistical computations are used to determine the size of the overall population. The greatest shortcoming of the capture-recapture approach is the large confidence intervals associated with the measure. It is not unusual to find confidence intervals of ±50% of the population parameter as illustrated by Abeni et al.

A statistical procedure that addresses the problem of estimating the size of a population without a unique personal identifier has been provided by Larsen's maximum likelihood estimate of the solution to the classical occupancy problem. Larsen applied his solution to the estimation of the number of people represented in an anonymous Chlamydia registry in one county in Denmark. His solution provides less precise estimates and contains greater error than the solution provided by the present invention. In addition, his solution does not address the population overlap problem.

SUMMARY OF THE INVENTION

Accordingly, it is an object of the present invention to identify an accurate quantity of unique individuals (entities, objects, items, etc.) in a data source containing potentially multiple records pertaining to a particular individual.

It is a further object of the present invention to identify an accurate quantity of unique individuals (entities, objects, items, etc.) overlapping across multiple data sources which may contain multiple records pertaining to a particular individual within a single data source or within multiple data sources.

It is another object of the present invention to determine a more precise and smaller range of variance of the quantity of unique individuals (or items) at a specified confidence interval (e.g. 95%) in a single data source or overlapping across multiple data sources which contain potentially multiple records regarding a particular individual in a single data source and/or across multiple data sources.

Objects of the present invention are achieved by providing an apparatus and method for probabilistic population size determination. The apparatus and method uses a computer to probabilistically calculate the population size of unique entities in data, containing records on unique entities without unique identifiers for the unique entities and having at least one common type of information with a known distribution of finite expectation, using decomposed probabilistic calculations based on values of the information with the known distribution. The decomposed probabilistic calculations used in determining population size include calculating a first probabilistic number of unique entities needed to satisfy a first value of the information with the known distribution, successively calculating a probabilistic incremental number of unique entities needed for a previous value of the information with the known distribution to increase to a subsequent value of the information with the known distribution, until the probabilistic number of unique entities needed to increase to a predetermined value of the information with the known distribution is calculated, and summing the first probabilistic number of unique entities and the probabilistic incremental numbers of unique entities.

Objects of the present invention are also achieved by providing an apparatus and method for probabilistic population size and population overlap determination. Data is found in first and second data sets containing records on the unique entities without unique identifiers for the unique entities and having at least one common type of information with a known distribution of finite expectation. A computer combines the first and second data sets into a combined data set and probabilistically calculates the population size for the first and second data sets in a fashion similar to the apparatus and method discussed in the preceding paragraph. The population overlap of the unique entities between the first and second data sets is then determined by subtracting a probabilistic incremental number of unique entities needed for a larger total number of values of the information with the known distribution from either of the first and second data sets to increase to a total number of values of the information with the known distribution in the combined data set from a smaller of the population size of the first and second data sets.

Objects of the present invention are also achieved by providing an apparatus (and a corresponding method) for probabilistic determination of population size and overlap having a storage medium, a data preparation unit, a population size measurement unit, a population overlap measurement unit, and a total population information generator. The storage medium stores first and second data sets containing the records on individuals without unique identifiers for the individuals, and the records have information on gender and birth date for each individual. The data preparation unit subdivides the records in the first, second, and combined data sets into multiple gender/year of birth cohorts, and determines a total number of unique birth dates in the first, second, and combined data sets for each gender/year of birth cohort. The population size measurement unit probabilistically calculates the population size for the first and second data sets in each gender/year of birth cohort by calculating a first probabilistic number of individuals needed to fill one date of birth, successively calculating a probabilistic incremental number of individuals needed for a previous number of dates of birth to increase to a subsequent number of dates of birth, until the probabilistic number of unique entities needed to increase to the total number of unique dates of birth is calculated, and summing the first probabilistic number of individuals and the probabilistic incremental numbers of individuals. The population overlap measurement unit determines the population overlap of the individuals between the first and second data sets by subtracting a probabilistic incremental number of individuals needed for a larger total number of unique birth dates from either of the first and second data sets to increase to a total number of unique birth dates in the combined data set from a smaller of the population size of the first and second data sets. The total population information generator calculates a total population size and a total population overlap by summing the population size of the first and second data sets and the population overlap across the multiple gender/year of birth cohorts.

Objects of the present invention are further achieved by providing a data preparation unit which performs diagnosis to identify discrepancies between the observed value and the maximum expected value of the information with the known distribution and to generate a warning or recommend solutions to overcome the discrepancy.

The population size measurement unit also calculates a population size variance corresponding to the population size determined for the first and second data sets for each gender/year of birth cohort. The population overlap measurement unit also calculates a variance corresponding to the probabilistic incremental number of individuals needed for the larger total number of unique birth dates from either of the first and second data sets to increase to the total number of unique birth dates in the combined data set, and calculates lower and upper population overlap variance values corresponding to the population overlap for each gender/year of birth cohort. The total population information generator calculates a total population size variance by summing the population size variance for the first and second data sets across the multiple gender/year of birth cohorts, and calculates total lower and upper population overlap variance values by summing the lower and upper population overlap variance values across the multiple gender/year of birth cohorts.

The population overlap measurement unit also calculates a ninty-five percent confidence interval for the population overlap for each gender/year of birth cohort and the total population information generator calculates a ninty-five percent confidence interval for the total population overlap based on the total lower and upper population overlap variance values and eliminating impossible ranges in variance.

Objects of the present invention are further achieved by providing an apparatus and method for probabilistic population overlap determination when the population size is known for a first and second data set containing unique entities identified by unique identifiers, but where the type of unique identifiers in the first data set are different from the type of unique identifiers used in the second data set. A storage medium stores first and second data sets containing records on the unique entities with first unique identifiers for the unique entities in the first data set different from second unique identifiers for the unique entities in the second data set, and having at least one common type of information with a known distribution of finite expectation. A computer combines the first and second data sets into a combined data set and determines the population overlap of the unique entities between the first and second data sets by subtracting a probabilistic incremental number of unique entities needed for a larger total number of values of the information with the known distribution from either of the first and second data sets to increase to a total number of values of the information with the known distribution in the combined data set from a smaller of the population size of the first and second data sets.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

The paragraphs that follow will provide a detailed description of the preferred embodiments of the invention for determining the size and overlap of human populations, and a simple example of the application of the invention to non-human populations. These paragraphs will also include a discussion of the general mathematical theory underlying the invention, and distinguish the solution to the population size problem offered by this invention from other solutions on both theoretical/mathematical and empirical grounds. Since mathematical solutions to the population overlap problem that do not require unique individual identifiers are not evident in the literature, the mathematics of this solution will be discussed without contrast to other solutions.

In the classical coupon collector problem, the solution to the problem answers the question "How many baseball cards must a collector collect to obtain a complete set of cards, when the probability of every card being in a given bubble gum package is known?". Larsen, for instance, provided a solution to this classical occupancy problem. However, Larsen solves the classical occupancy problem using maximum likelihood estimation techniques. In particular, Larsen approximated the classical occupancy theory using the Poisson distribution. By using the approximation, Larsen was able to estimate the size of a population and its variance.

In fundamental contrast to Larsen, the present invention solves the classical occupancy problem using random variable decomposition techniques, without resort to approximation. The present invention is able to provide a determination of population size and variance that is based on a different probabilistic method. In particular, the present invention builds upon the classical occupancy theory, but provides an operationalization of classical occupancy theory that is fundamentally different from the operationalization provided by Larsen.

First, the present invention decomposes the problem into a set of constituent problems before applying a mathematical model, while Larsen's formulation begins with the application of his mathematical model. Second, the present invention allows for the selection of a mathematical model that is appropriate to the specific distribution under examination, while the mathematical model used in Larsen's formulation only applies when the characteristic is uniformly distributed.

Larsen's solution to the coupon collector problem begins with a mathematical approximation in the first step of the solution that requires that the distribution of the known characteristic be uniform. Where "I" is the number of observed dates of birth in a gender/year of birth cohort and where $P_j$ is the population estimate for each gender/year of birth subset "j", Larsen's technique would determine the number of individuals to be $$P_j(l) = 365 \times \log\left(\frac{365}{365 - l}\right) \qquad (1)$$

and the variance $\sigma^2(P_j(l))$ to be $$\sigma^2(P_j(l)) = \frac{(l \times 365)}{(365 - l)} \qquad (2)$$

The solution to the coupon collector problem used in the present invention begins with a decomposition of the problem which does not involve mathematical approximation. This decomposition involves breaking down the larger question into a series of smaller questions for which the mathematical solution is known. In a preferred embodiment of the present invention, the present invention applies this decomposition to the determination of the number of unique individuals (persons or other entities) represented in a data set that does not include a unique individual identifier. Using decomposition, the total number of individuals needed to fill a prespecified number of categories (of an attribute having a known distribution of finite expectation) is equivalent to the number of individuals needed to fill one category, plus the number needed to fill a second category once the first is full, plus the number necessary to fill a third once the second is filled, etc., until the prespecified number of categories is filled. In mathematical terms, this procedure can be represented by the general formula, $$P_j(l) = \sum_{i=1}^{l} E(X_i) \quad (3)$$

where "I" is the total number of observed values for the type of information with a known distribution of finite expectation $E(X_i)$ and and where $P_j$ is the population estimate for each subset "j" of the original data.

In general, the present invention first calculates an initial number of unique entities needed to fill a first value of a type of information with a known distribution of finite expectation, and then successively calculates a probabilistic incremental number of unique entities needed for a previous value of the information with the known distribution to increase to a subsequent value of the information with the known distribution, until the probabilistic number of unique entities needed to increase to a predetermined value of the information with the known distribution is calculated. The numbers of unique entities calculated with the above procedure is summed to determine a total population size.

A simple example that uses non-human populations to illustrate the general approach could involve the determination of the number of distinct automobiles that enter a mythical nation on an average week day. The country's border check points keep records that describe every car that passes. This record includes the make, model, year of manufacture, and color of every vehicle, but does not contain a unique vehicle identifier (e.g. a licence plate number). All of this information is recorded every time a vehicle passes a check point. Since some vehicles pass a check point many times a day, information describing these vehicles will appear in the data set many times.

For security reasons, the Czar of this mythical nation demands to know how many different motor vehicles enter his nation every day. The present invention can answer this question without additional data collection by applying the procedure describe above to the routine administrative data base created by the border check points.

For purposes of this example, we will assume that all automobiles on our mythical county's continent are manufactured by one of ten automobile companies, and that the continent's vehicles include each of these makes in equal numbers.

The first step in the process would be to summarize the contents of the data base for a single day. In our example we will say that automobiles passed entry check points in our country 100 times on the 26th of July, and that six of the ten automobile manufacturers were represented in the data base for that day. The facts that six makes of automobile were observed and that each make is equally represented in the total pool of automobiles are the only information required by the present invention to determine the number of unique automobiles represented in the data set for July 26.

In order to determine the total number of unique automobiles represented, the problem is broken down into six distinct problems. The first problem is to determine the number of automobiles that would need to pass a check point before two makes were represented (probability theory says 1.11 automobiles would meet this requirement). The second problem is to determine the number of additional automobiles that would need to pass before three automobile makes would be observed (probability theory says 1.25 additional automobiles would meet this requirement).

TABLE 1

Results of probabilistic calculations for simple example, assuming ten makes of automobiles with equal representation in the total pool of vehicles.

| Observed[1] | 1 | 2 | 3 | 4 | 5 | 6 | 7 | 8 | 9 |
|---|---|---|---|---|---|---|---|---|---|
| Increment[2] | 1.11 | 1.25 | 1.43 | 1.67 | 2.00 | 2.50 | 3.33 | 5.00 | 10.00 |
| Total[3] | 1.11 | 2.36 | 3.79 | 5.46 | 7.46 | 9.96 | 13.29 | 18.29 | 29.29 |

[1]Number of observed automobile makes.
[2]Number of unique automobiles to increase the number of observed makes from the previous but not to exceed the subsequent number of makes.
[3]Number of unique automobiles to produce the observed number of automobile makes.

Continuing, as illustrated in Table 1 above, through the problem of determining the number of additional automobiles that would need to pass after five automobile makes were observed but before seven automobile makes would be observed (probability theory says 2.5 additional automobiles would meet this requirement). The answer to the Czar's problem is the sum of the answers to these six problems (9.96=1.11+1.25+1.43+1.67+2.0+2.5 automobiles).

When all makes of automobile are observed (probability theory says this will occur when 28.29 automobiles are represented in the data set) it is necessary to introduce another characteristic of the automobiles into the calculations (the color or the year of manufacture, for instance). This procedure will be discussed in more detail below.

In a preferred embodiment of the present invention, the number of observed birth dates "I" is calculated for each gender/year of birth cohort "j" and these parts are considered independently. The number of people necessary to produce a single date of birth is calculated, the number of people necessary to produce a second date of birth after a first has already been observed is calculated, and so forth until the number of birth dates observed in the cohort is achieved.

In other words, a preferred embodiment of the present invention first calculates a probabilistic number of individuals needed to fill one birth date and then successively calculates a probabilistic incremental number of individuals needed for a previous number of dates of birth to increase to a subsequent number of dates of birth, until the probabilistic number of individuals needed to increase to the total number of unique dates of birth is calculated. The results of these calculations are then summed to provide the determination of the original problem (i.e., the number of people necessary to produce the total observed birth dates for a particular gender/year of birth cohort). For birth dates, where a uniform distribution is appropriate, the number of individuals is determined by $$P_j(l) = \sum_{i=1}^{l} \frac{365}{365-i} \quad (4)$$

and the variance of the number of people is determined by $$\sigma^2(P_j(l)) = \sum_{i=1}^{l} \frac{(i \times 365)}{(365-i)^2}. \quad (5)$$

Thus, a preferred embodiment of the present invention answers the question "How many people would need to be represented in a data set to produce a specific number of observed combinations of birth date (month, day, and year) and gender?" Probabilistically, the odds that at least two people in a randomly assembled group of 23 people will share a month and day of birth are 50—50. If a room of randomly assembled individuals had 23 different birth dates, the size of the group could be probabilistically estimated to be 24.6 (plus or minus 0.9). Applied to large data set having gender and birth data, similar mathematical reasoning makes it possible to predict the number of individuals represented in a database.

A preferred embodiment of the present invention also determines overlap between two data sets that do not include a unique individual identifier. To find the population overlap, the present invention employs the same decomposition approach that is used to determine population size. First, the present invention applies the procedure described above for determining the population size of the first and second original data sets. Then, the probabilistic number of individuals needed for a larger total number of unique birth dates from either of the first and second data sets to increase to a total number of unique birth dates in the combined data set is calculated. This calculation is similar to the approach used in determining population size and can be represented by the general formula $$P_j(b, c) = \sum_{k=b+1}^{c} E(X_k) \qquad (6)$$

where $P_j(b,c)$ is the population estimate for a gender/year of birth cohort "j" necessary for the larger total number of unique birth dates from either of the first and second data sets ("b") to increase to a total number of unique birth dates in the combined data set ("c"), and where $E(X_k)$ is the finite expectation of the variable being measured.

The actual population overlap is the difference between a smaller of the population size of the first and second data sets and the probabilistic number of individuals needed for the larger total number of unique birth dates from either of the first and second data sets to increase to the total number of unique birth dates in the combined data set.

In the simple example introduced above, once the Czar learns the number of distinct automobiles entering his country, the Czar demands to know how many of these automobiles had been issued parking tickets in his country on the same day they entered the country. Although the parking ticket data base includes a unique automobile identifier, it does not specify whether the vehicle entered the country on the day the parking ticket was issued. The present invention can answer the Czar's question by determining the overlap between the border check point data set and the parking ticket data set for any specified day.

The first step is to summarize the contents of the parking ticket data base and a combined (concatenated) parking ticket and border check point data base for the 26th of July in the same way that the border check point data base was summarized earlier. In our example, we will say that nine parking tickets were issued to eight unique automobiles that represented five automobile manufacturers. The combined data base includes 109 records that describe automobiles that represent seven manufacturers.

A two step process is used to determine the total number of unique automobiles that received parking tickets on the day they entered the country. First, the number of unique automobiles required to increase the number of observed automobile makes from the number of automobile makes in the larger of the two original data sets to the number of automobile makes observed in the combined data set is calculated. In this example, probability theory says that 3.33 unique automobiles are required to increase from the six makes in the check point data base to the seven makes in the combined data set (Table 1). Second, the result of the above calculation is subtracted from the number of automobiles in the smaller of the two original data sets to determine the number of unique automobiles that received parking tickets on the same day as they entered the country. In this simple example, the answer to the Czar's question is 4.67 automobiles. This result is obtained by subtracting 3.33 (the number of unique automobiles that are required to increase from the six makes in the check point data base to the seven makes in the combined data base) from eight (the number of automobiles in the parking ticket data base according to its true unique automobile identifier).

The present invention is also superior to Larsen's formulation in that a preferred embodiment of the present invention may utilize any known distribution (e.g. uniform, lognormal, negative exponential, etc) of personal characteristics. In the prior art, only the uniform distribution could be used. In a preferred embodiment of the present invention, a uniform distribution with 365 (or 366) categories to model date of birth is used, but the present invention can be applied to any known distribution with finite expectation.

Reference will now be made in detail to further preferred embodiments of the present invention, examples of which are illustrated in the accompanying drawings, wherein like reference numerals refer to like elements throughout. The following preferred embodiment, using data on birth and gender, is merely exemplary of the present invention. However, the present invention is more widely applicable, as illustrated in the simple automobile example and as discussed below.

Figure 1:
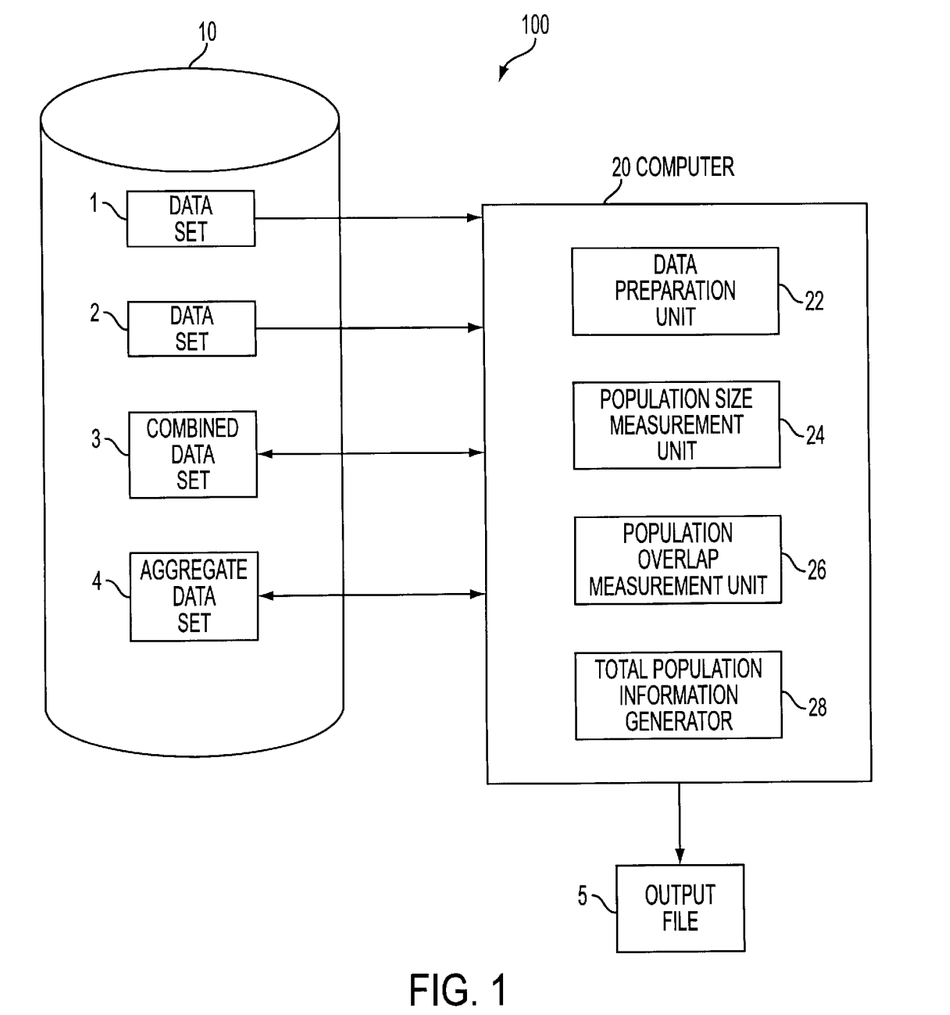
FIG. 1 is a block diagram of a population size and overlap determination apparatus according to a preferred embodiment of the present invention.

FIG. 1 shows a preferred embodiment of a population size and overlap determination apparatus 100 according to the present invention. The apparatus 100 measures the number of people represented in a data set that does not contain a unique personal identifier, but does contain information on enduring personal characteristics for which the distribution in the general population is known. The apparatus 100 also measures the number of people who are represented in more than one data set when no common unique identifiers are shared across data sets.

The apparatus 100 includes a storage medium 10 and a computer 20. The computer 20 may be a general purpose computer, or the like, that can execute software programs and instructions. The computer 20 includes a data preparation process or unit 22, a population size measurement process or unit 24, a population overlap measurement process or unit 26, and a total population information generator 28.

The storage medium 10 may be an electronic storage medium, including magneto-optical disks, RAM, ROM, CDs, diskettes, or the like, that can store a data set 1, a data set 2, a combined data set 3, and an aggregate data set 4 used by the apparatus 100, as well as the processes described herein. Each data set may also be stored in separate storage mediums. An output file 5 contains the output generated by the apparatus 100. While the output file 5 is depicted in FIG. 1, the output may also be a data set, a printed report, a display on a computer screen, or any other medium for presenting the analysis and results generated by the present invention.

Figure 2:
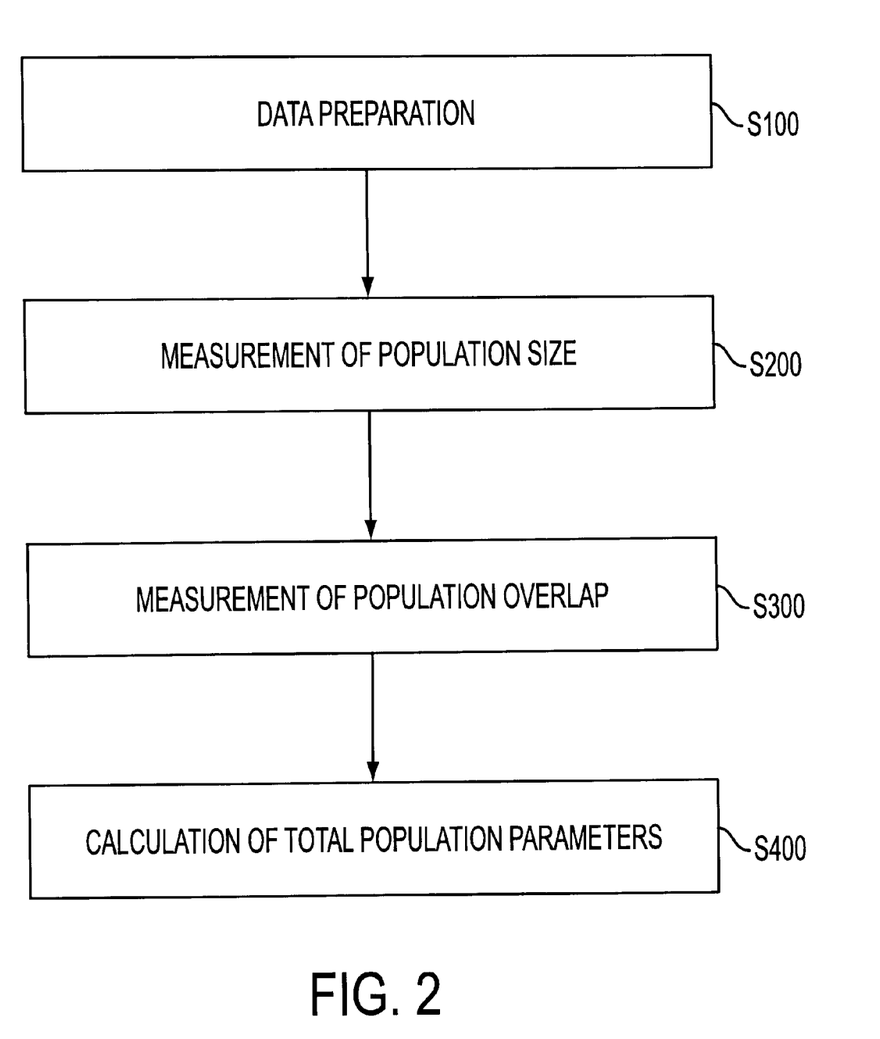
FIG. 2 is a flow chart describing steps performed by corresponding processing units in a computer 20 of FIG. 1.

FIG. 2 depicts steps performed by corresponding units in the computer 20. The data preparation unit 22 executes a data preparation step S100, the population size measurement unit 24 executes a measurement of population size step S200, the population overlap measurement unit 26 executes a measurement of population overlap step S300, and the total population information generator 28 executes a calculation of total population parameters step S400.

Figure 3:
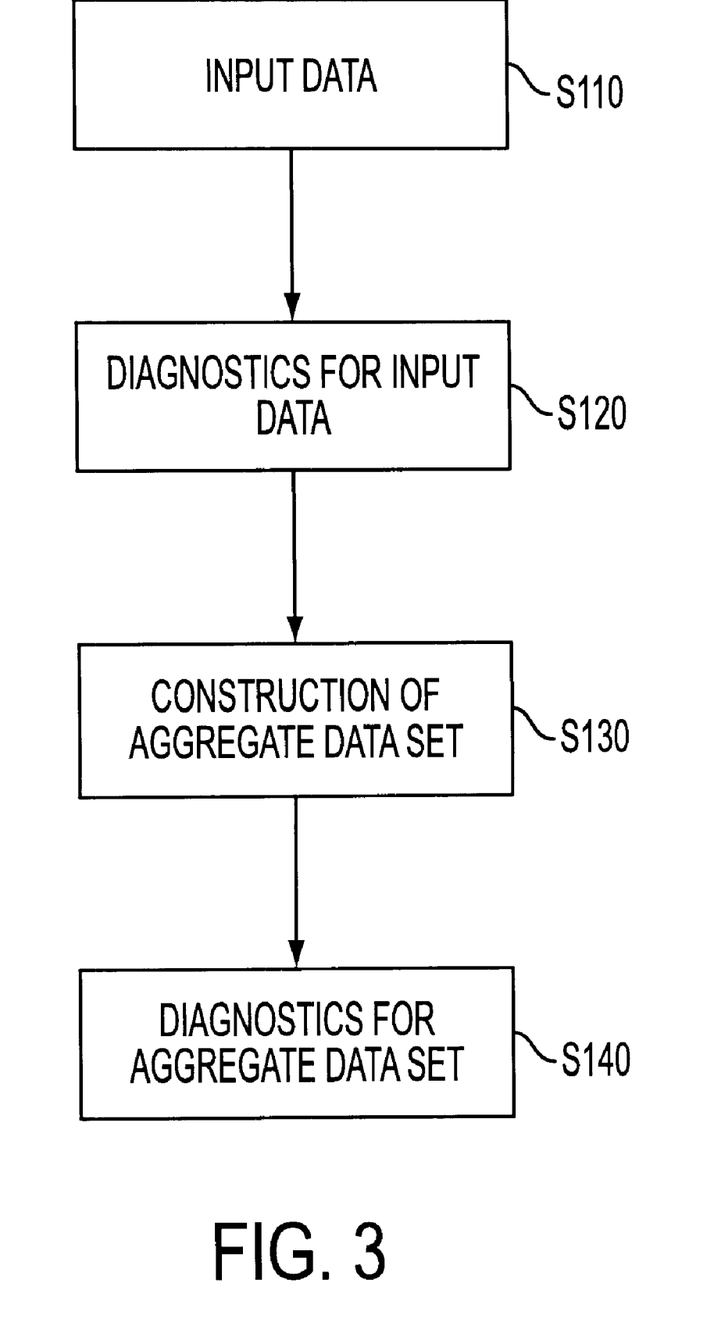
FIG. 3 is a flow chart describing steps corresponding to a data preparation step S100 of FIG. 2.

FIG. 3 is a flowchart depicting steps performed by the data preparation unit 22 in the data preparation step S100. In an input data step S110, the computer 20 receives input data stored in data sets 1 and 2. The input data consists of discrete records that describe individuals, events, or objects that relate to individuals. The data sets 1 and 2 may contain one record per person or multiple records per person. In the present preferred embodiment, each record contains the date of birth (year, month, and day) of the person it pertains to. Information on the gender of the person is also utilized in the preferred embodiment described here. However, other attributes of people that have known probability distributions in the general population may be used in place of the date of birth. For instance, other information pertinent to specific analytical interests (including, but not limited to, clinical, economic, and social-demographic characteristics of the person) may be included as well. The data sets 1 and 2 may also be defined by, for example, organizational, geographical, temporal, fiscal, or other characteristics.

In a diagnostics for input data step S120, the distribution of month of birth and day of birth in each data set 1 and 2 is compared to theoretical distributions of day of the month, and month of the year (i.e., thirty to thirty-one days per month and twelve months per year). When a different variable with a known distribution is used (e.g. HLA blood type, eye color, etc.), the observed distribution is compared to the expected distribution. The results of all diagnostics, including the nature and amount of any discrepancies between observed and theoretical distributions, will be included in the output file 5. When there are gross discrepancies between the observed and the expected distributions, a warning will be generated (e.g., included in the output file 5). This warning will indicate that the assumptions underlying the preferred embodiment may not hold. Possible alternatives include consulting with the organization that produced the data set, and consideration of alternative partitioning of the data set.

In a construction of aggregate data set step S130, the combined data set 3 is constructed (concatenated) from each of the original data sets 1 and 2 and the data from each of these three data sets (the data set 1, the data set 2, and the combined data set 3) are aggregated to create a fourth data set, i.e. an aggregate data set 4. In this preferred embodiment, each record in the aggregate data set 4 pertains to a gender and year of birth combination (e.g. men born in 1945, women born in 1945, men born in 1946, etc.). In addition, each record in the aggregate data set 4 includes seven types of information. These types of information include specifications for the year of birth and gender the record describes, and the number of birth dates for that year of birth and gender that appeared in each of the three data sets (the data set 1 the data set 2, and the combined data set 3), and the number of unique individuals represented in the two original data sets 1 and 2 when this is known.

The construction of aggregate data set step S130, and the other steps that follow, may be performed for any subcategory of analytical interest for which data is available in one or both of the original data sets 1 and 2 (e.g. people from a specified geographical area, people with a specified disorder, and people in a specified demographic category) when subcategory specific size and overlap parameters are desired.

In a diagnostics for combined data set step S140, the number of dates of birth represented in each record of the aggregate data set 4 is compared to the maximum possible (e.g. the total number of days in the year) and the frequency distribution is reported in the output file 5. If the number of days represented is equal to the maximum possible, a fatal error warning is issued, and possible solutions to the problem are included in the output file 5. The possible solutions to the problem are listed below in order of preference.

1. Another enduring personal attribute is added and the construction of aggregate data set step S130 is repeated. If ethnicity were added, for instance, each record in the aggregate data set 4 would pertain to a specific gender, year of birth, and ethnicity combination (e.g., white men born in 1945, non-white men born in 1945, white women born in 1945, non-white women born in 1945, white men born in 1946, etc.). Each record would include specifications for the year of birth, gender and ethnicity it describes, and the number of birth dates for that year of birth, gender, and ethnicity that appeared in the input data sets 1, 2, and 3.

2. The scope of the aggregate records can be expanded so that the number of observed birth dates is less than the largest possible number. This can be accomplished by joining a year in which the number of dates of births is less than the possible number, to a year for which the number of possible dates of birth is equal to the maximum possible. For example, if 365 birth dates were observed for men born in 1945 and 345 birth dates were observed for men born in 1946, combining the two years would result in a time period for which 710 of a possible 730 birth dates was observed. In this case the record in the aggregate data set 4 would be redefined to describe men born in 1945 or 1946. Application of this solution requires that all appropriate elements of the computer programming steps be modified to specify the maximum possible number of days in the redefined record.

3. When necessary, a combination of the two above-described solutions is used to solve the problem.

4. When the two above-described solutions are inadequate to solve the problem, a sampling based statistical step (known as a limiting dilution assay in biology) may by used.

When the number of days represented in one of the records in the aggregate data set 4 approaches the maximum possible, a warning is added to the output file 5. The warning will include a description of the first two options listed above.

Figure 4:
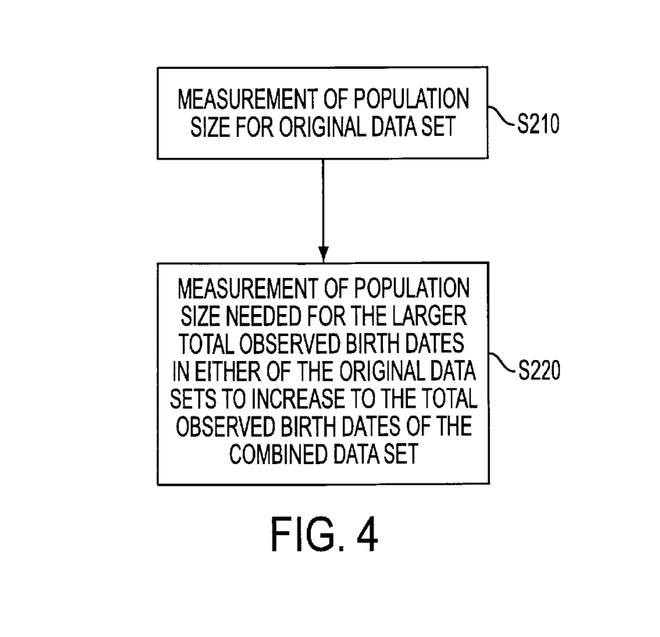
FIG. 4 is a flow chart describing steps corresponding to a measurement of population size step S200 of FIG. 2.
Figure 5:
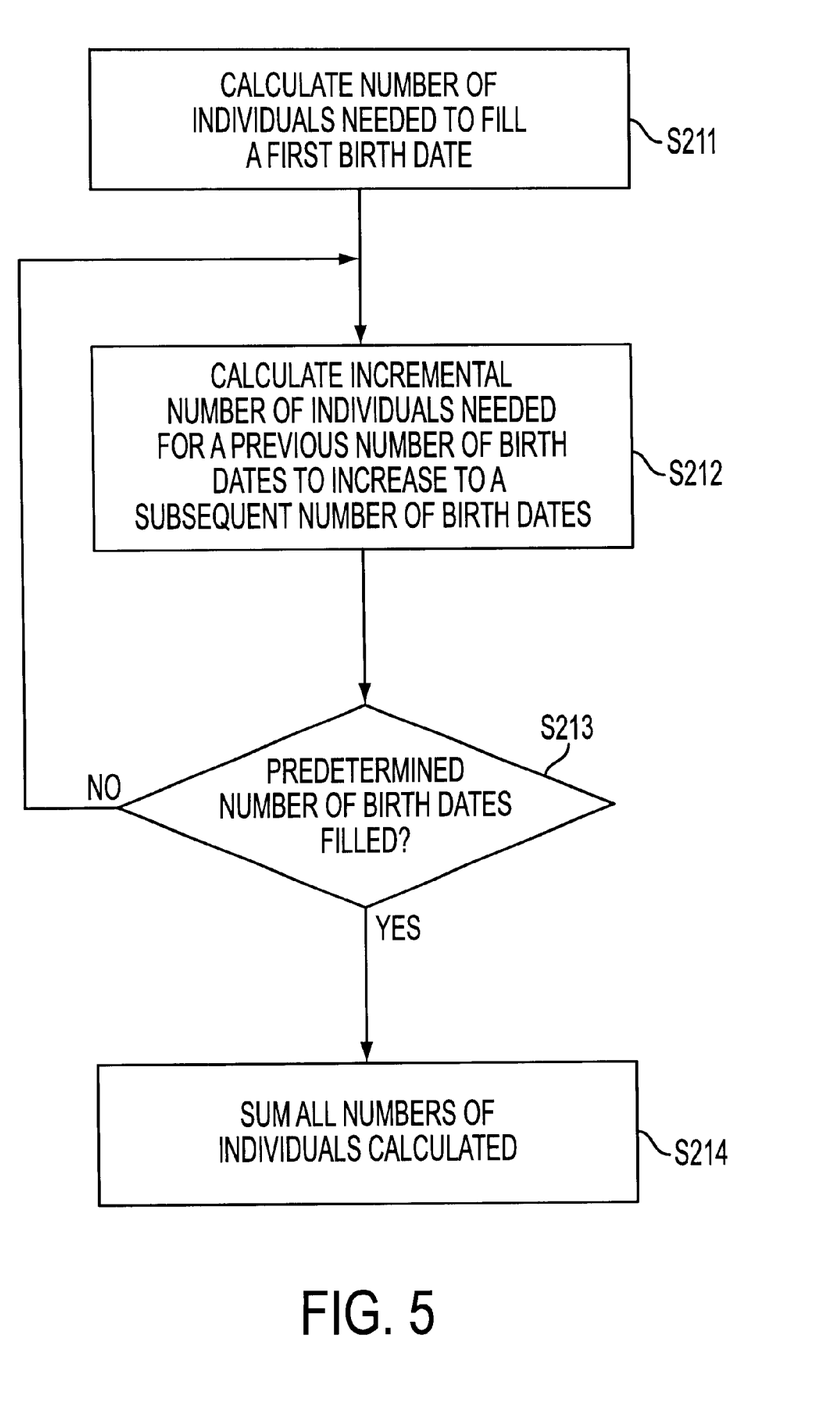
FIG. 5 is a flow chart describing detailed steps for the measurement of population size for original data sets step S210 of FIG. 4.

FIG. 4 is a flow chart describing steps corresponding to the measurement of population size step S200. The probabilistic determination of population size in the measurement of population size step S200 is conducted for each record in the aggregate data set 4. A population size is determined for each of the original data sets 1 and 2 in step S210. In addition, the population size necessary for the number of observed birth dates from the data set 1 or 2 having the larger number of observed birth dates to increase to the number of birth dates observed in the combined data set 3 is determined in step S220.

In a measurement of population size for original data set step S210, for each gender/year of birth cohort record "j" in the aggregate data set 4 with "I" number of birthdays in either the data set 1 or 2, the number of people represented in the subset is determined by equation 7:

$$P_j(I) = \sum_{i=1}^{I} \frac{365}{365-i} \tag{7}$$

Figure 6:
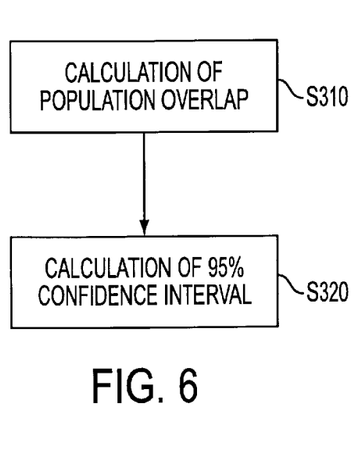
FIG. 6 is a flow chart describing steps corresponding to a measurement of population overlap step S300 of FIG. 2.

Equation 7 determines the population size of each data set 1 and 2 for each gender/year of birth cohort by calculating the probabilistic number of individuals needed to fill one birth date, plus the probabilistic incremental number of individuals needed to increase from one birth date and fill a second birth date, plus the probabilistic incremental number of individuals needed to fill a third birth date, and so on, until the probabilistic number of individuals needed to fill the total observed birth dates is calculated. As depicted in FIG. 6, the number of individuals needed to fill a first date of birth is calculated in step S211. Then, in step S212, this preferred embodiment of the present invention successively calculates a probabilistic incremental number of individuals needed for a previous number of dates of birth to increase to a subsequent number of dates of birth, until the probabilistic number of unique entities needed to increase to the total predetermined number of unique dates of birth is calculated (step S213 checks if the predetermined number of dates of birth have been filled). In step S214, the number of individuals calculated above is summed to provide the population size of data sets 1 and 2 for each gender/year of birth cohort, "j". The resulting values become part of each record in the aggregate data set 4. When the year is a leap year, the value 365 is replaced by 366 in equation 1 and all subsequent equations.

For each record in the aggregate data set 4 with "I" number of birthdays, the variance of the number of people represented in the subset is determined by equation 8:

$$\sigma^2(P_j(l)) = \sum_{i=1}^{l} \frac{(i \times 365)}{(365-i)^2} \quad (8)$$

In step S220, a determination is made as to the population size necessary for the number of birth dates from the number observed in the larger of the two original data sets 1 and 2 to increase to the number of birth dates observed in the combined data set 3. When the number of birth dates in the larger original data set is smaller than the number in the combined data set, the measurement of step S220 is determined by equation 9:
where $P_j(b,c)$ is the population estimate for a gender/year of birth cohort "j" necessary for the larger total number of unique birth dates from either of the first and second data sets ("b") to increase to a total number of unique birth dates in the combined data set ("c").

When the number of birth dates in the larger original data set is equal to the number in the combined data set 3, the measurement of step S220 is determined by equation 10:

$$P_j(b, c) = \frac{1}{2}\left(\frac{365}{365-c}\right) \quad (10)$$

For each record in the aggregate data set 4, the variance $\sigma^2(P_j(b,c))$ of the number of people necessary to increase the number of observed birth dates from the number of birth dates observed in the larger of the two original data sets 1 and 2 to the number of birth dates observed in the combined data set 3 is determined by equation 11:

As a result of the above calculations, six new data elements are added to each record in the aggregate data set 4. The first two data elements are the determined population size for each of the two original data sets 1 and 2. The second two data elements are the variance of this population size for each of the two original data sets 1 and 2. The last two variables are the number of people necessary for the number of birth dates to increase from the number observed in the larger of the two of the original data sets 1 and 2 to the number observed in the combined data set 3, and the variance for this value.

FIG. 6 is a flow chart describing steps corresponding to the measurement of population overlap step S300. In a calculation of population overlap step S310, probabilistic determination of population overlap is conducted for each record in the aggregate data set 4. Population overlap is the difference between the number of people represented in the smaller of the two original data sets 1 and 2 and the number of people needed for the increase in the number of birth dates observed from the larger of the two original data sets 1 and 2 to the combined data set 3. Calculating population overlap depends on whether the smaller number of individuals represented in either the original data sets I or 2 is known (based on a data set specific unique person identifier) or has been statistically determined by the steps identified above.

The calculation of population overlap step S310 is determined by equation 12:

$$P(\text{overlap}) = P(a) - P(b,c) \quad (12)$$

where P(a) is the number of people represented (population size) in the smaller data set and P(b,c) is the population size necessary for increasing the number of birth dates observed in the larger (i.e., having more observed birth dates) of the two original data sets 1 and 2 to the number of birth dates observed in the combined data set 3. P(a) is the actual number of people when this number is known. When this number is not known, P(a) is the number determined by the calculations above.

When the sum of the number of birth dates in the two original data sets 1 and 2 is equal to the number of birth dates in the combined data set 3, the overlap is set to zero. When the population overlap derived by the above step S310 is less than zero, the population overlap parameter is set to zero which is the smallest overlap possible.

Calculating the variance of the population overlap $\sigma_P^2$ (overlap) is determined by equation 13:

$$\sigma_P^2(\text{overlap}) = \sigma^2(P(a)) + \sigma^2(P(b,c)) \quad (13)$$

where $\sigma^2(P(a))$ is the variance of the number of people represented (population size) in the smaller data set and $\sigma^2(P(b,c))$ is variance of the population size necessary for increasing the number of birth dates observed in the larger (i.e., having more observed birth dates) of the two original data sets 1 and 2 to the number of birth dates observed in the combined data set 3. The variance of the population size in the smaller data set 2(P(a)) is equal to zero when the number of people is known, and is calculated using equation (8) when the number of people is not known. When the sum of the number of birth dates in the two original data sets 1 and 2 is equal to the number of birth dates in the combined data set 3, the variance of the overlap $\sigma_P^2$(overlap) is set to zero.

In a calculation of 95% confidence interval step S320, 95% confidence intervals are calculated as the determination of population overlap, plus and minus 1.96 times the standard deviation (square root of variance) determined in equation (13). In some cases, this calculation step S320 will result in a range that includes impossible values (i.e. negative values, or values greater than the known number of individuals). In order to eliminate variance that is impossible, separate variance parameters are calculated for the low side and the high side of the overlap parameter. This results in an asymmetric confidence interval. These considerations will be invoked under the following three conditions.

1. When the variance around the overlap parameter includes a negative number, the variance for the low side of the parameter is decreased so that the overlap parameter minus 1.96 times the standard deviation is zero. For example, when the calculations indicate that a record includes an overlap of 3 people and the variance is 4 people, these parameters include the theoretical possibility of −1 person, a practical impossibility. In this case the variance parameter for the low side of the population parameter would be decreased to 2.25.

2. When the variance around the overlap parameter includes a number that is greater than the known number of people in the smaller of the two original data sets, the variance for the high side of the parameter is decreased so that the overlap parameter plus 1.96 times the standard deviation is equal to the number of people in the smaller of the two data sets. This will only be detectable when the smaller of the data sets 1 and 2 include a data set specific unique person identifier.

Three new variables are added to each record of the aggregate data set 4 as a result of step S320. These include the determination of population overlap, and the two components (low side and high side) of the asymmetrical variance associated with the overlap.

Figure 7:
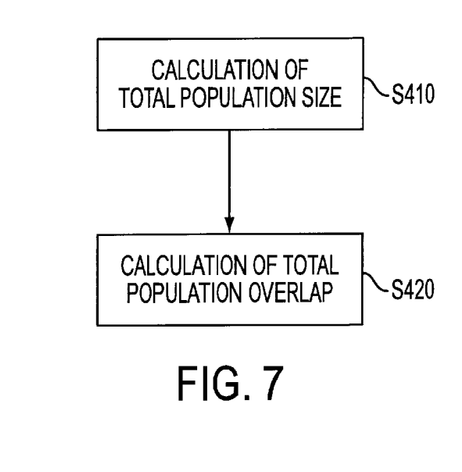
FIG. 7 is a flow chart describing steps corresponding to a calculation of total population parameters step S400 of FIG. 2; and, FIG. 8 is a comparison chart between the coefficients of variation between determinations produced by the present invention and those produced by Larsen.

FIG. 7 is a flow chart describing steps corresponding to the calculation of total population parameters step S400. As mentioned above, the results of the probabilistic measurement of population size step S200 and the measurement of population overlap step S300 includes the population size and overlap parameters for the input data sets 1 and 2. Population size parameters include the determination of the number of people represented in each of the original data sets 1 and 2, and verification of these parameters for data sets that included unique person identifiers. Population overlap parameters include the number of people represented in both data sets (with 95% confidence intervals).

In a calculation of total population size step S410, parameters for the total number of people represented in the two original data sets 1 and 2 and the confidence limits for this parameter are obtained by combining the results for every record in the aggregate data set 4. The total number of people $P_{Total}$ is obtained by summing the population parameters over all "k" records (or gender/year of birth cohort subsets) as in equation 14:

and the total variance $\sigma^2(Total)$ is obtained by summing the variance for each record as in equation 15:

where k is the total number of records in the aggregate data set 4. The estimate of the 95% confidence interval is constructed as in equation 16:

$$P_j \pm 1.96\sigma(P_j) \tag{16}$$

When an original data set contained a unique person identifier, the statistically derived population parameter is compared to the parameter indicated by the unique identifier in the original data set. This comparison provides a data set specific verification of the statistical procedure. The results of this verification procedure are reported in the output file 5 in all cases. When the actual number of people is not included within the confidence interval of the determined parameter, a warning is issued in the output file 5. If the probabilistic population parameter does not include the actual number of people, this result may indicate that the original data set did not conform to assumptions about the equal probability of birth dates, may indicate that the unique identifier provided with the original data is flawed, or the result may be the predictable one in twenty cases in which the 95% confidence interval does not contain the true value.

In a calculation of total population overlap step S420, parameters for the number of people represented in both of the original data sets 1 and 2 and the confidence limits for this parameter are obtained by combining the results for every record in the aggregate data set 4. The total number of people overlapping $P_{Total\ Overlap}$ is obtained by summing the overlap parameters $P_j(overlap)$ over all "k" records as in equation 17:

The lower variance is obtained by summing the lower variance for the overlap parameter from each record, and the upper variance is obtained by summing the upper variance for the overlap parameter from each record. Equation 18: presents the computation for the lower variance $\sigma^2(Lower\ Total)$ where k is a counter for the number of records in the complete data set. A similar equation provides the upper variance of the overlap parameter for the complete data set.

The estimate of the 95% confidence interval is constructed as in equation 19:

$$P-1.96\sigma(lower), P+1.96\sigma(upper) \tag{19}$$

Additional output to the output file 5 may include size and overlap parameters for age and gender categories, or for other categories of people for which basic information is available in one or both of the original data sets 1 and 2. Age and gender reporting may be provided by additional levels of summation at the output stage of the process. The determination of parameters for other pertinent characteristics may be obtained by repeating the entire analytical process for each desired reporting category, or by expanding the record to include parameters for the desired person characteristics.

According to a population size and overlap determination apparatus and method according to a preferred embodiment of the present invention, a more accurate and superior population size and overlap determination between multiple data sources may be made. As mentioned above, the present invention builds upon the classical occupancy theory, but utilizes a fundamentally different, and far superior, operationalization of the classical occupancy theory than conventional techniques. In fundamental contrast to Larsen, the present invention solves the classical occupancy problem using random variable decomposition techniques, without resort to approximation. The present invention is able to provide a determination of population size and variance that is based on a different probabilistic method.

Figure 8:
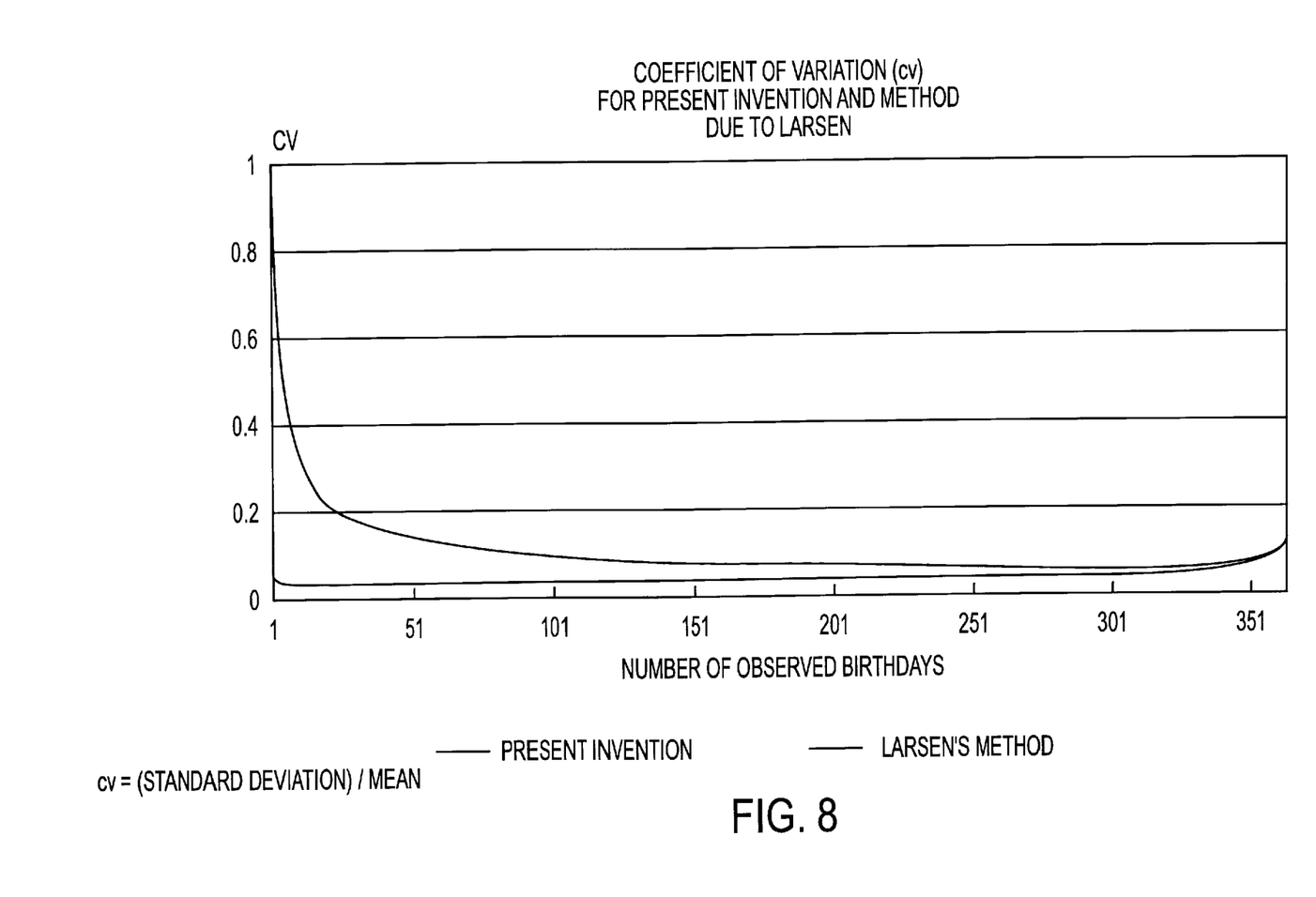

The present invention is superior to the approach proposed by Larsen in three ways. First, the present invention is superior because it is more flexible. It can determine population size even when the known characteristics of members are not uniformly distributed. For example, if a data set included information on HLA blood type, which has a known, but non-uniform distribution, the number of individuals represented in the data set can be determined by the present invention. Second, the present invention always provides smaller coefficients of variation than Larsen's. FIG. 8 shows that calculation of the coefficient of variation for each of the two approaches indicates that the present invention will always produce smaller coefficients of variation than Larsen's maximum likelihood solution to his approximation of the classical occupancy problem. Third, the present invention allows for the direct determination of population overlap. In order to estimate the number of individuals who are represented in both of two distinct data sets, neither of which includes a true unique individual identifier, the procedure described above can simply be applied three times; once each to the separate data sets, and once to a combined data set. While the difference between the sum of the estimates for the two distinct data sets and the estimate for the combined data set is an estimate of the number of individuals who are represented in both data sets, such a procedure, however, would result in an exaggerated error statement. Thus, in order to provide a more reasonable confidence interval, the present invention estimates the number of unique individuals that are added when the smaller number of observed birth dates of either the first or second data set is added to the number of observed birth dates of the larger combined data set.

While a preferred embodiment was described above, the present invention is not limited to the population size and overlap determination apparatus of the above embodiment. For example, the data preparation unit 22, the population size measurement unit 24, the population overlap measurement unit 26, and the total population information generator 28 may be segments of a computer program embodied on a computer-readable medium. Also, more than two original input data sets may be provided. It is to be understood that the present invention is generally applicable to determining the parameters of overlap associated with multiple data sets.

In addition, other personal characteristics may, of course, be used. The above embodiment performed analysis based on date of birth and gender. However, the present invention may also use any enduring personal characteristic or non-changeable phenomena for which the distribution in the general population is known and finite. Moreover, the above embodiment focused on human populations. It is to be understood, however, that the present invention is also applicable to nonhuman populations (including animate and inanimate objects) for which one or more characteristics of individual elements/members are variable and have a known distribution in the larger class of objects.

While the above-described preferred embodiments addressed the situation where there are no unique identifiers for unique entities in first and second data sets, the present invention is also applicable to the probabilistic determination of population overlap when there are unique identifiers for unique entities in the first and second data sets, but the type of unique identifiers in the first data set are different from the type of unique identifiers used in the second data set. For instance, people's social security numbers may be used in a first data set, while unique proprietary insurance policy numbers are used instead in a second data set. Therefore, the population size may be accurately determined using the respective (but different) unique identifiers for the first and second data sets. However, since the unique identifiers are not of the same type (e.g., no correlation between social security numbers in the first data set and the proprietary insurance policy numbers in the second data set, in this example), the problem of overlap determination still exists. In this example, the population overlap may still be determined with the probablistic population overlap determination of the preferred embodiments described above.

Furthermore, although a few preferred embodiments of the present invention have been described, it would be appreciated by those skilled in the art that changes may be made in these embodiments without departing from the principles and spirit of the invention, the scope of which is defined in the claims and their equivalents.

What is claimed is:

1. An apparatus for probabilistic human population size determination, comprising a computer probabilistically calculating human population size of unique human individuals in data of a database representing humans, containing records on the unique human individuals without unique identifiers for the unique human individuals and having at least one common type of information with a known distribution of finite expectation, using decomposed probabilistic calculations based on values of the information with the known distribution.

2. An apparatus as recited in claim 1, wherein said computer calculates a first probabilistic number of unique entities needed to satisfy a first value of the information with the known distribution, successively calculates a probabilistic incremental number of unique entities needed for a previous value of the information with the known distribution to increase to a subsequent value of the information with the known distribution, until the probabilistic number of unique entities needed to increase to a predetermined value of the information with the known distribution is calculated, and sums the first probabilistic number of unique entities and the probabilistic incremental numbers of unique entities.

3. An apparatus for probabilistic population size and population overlap determination, comprising:
a storage medium storing a database comprising first and second data sets containing records on the unique human individuals without unique identifiers for the unique human individuals and having at least one common type of information with a known distribution of finite expectation; and
a computer combining the first and second data sets of the database into a combined data set in the database, probabilistically calculating the population size of the human individuals for the first and second data sets of the database using decomposed probabilistic calculations based on values of the information with the known distribution, and determining the population overlap of the unique individuals between the first and second data sets by subtracting a probabilistic incremental number of unique individuals needed for a larger total number of values of the information with the known distribution from either of the first and second data sets to increase to a total number of values of the information with the known distribution in the combined data set from a smaller of the population size of the first and second data sets.

4. An apparatus as recited in claim 3, wherein said computer probabilistically calculates the population size of each of the first, second, and combined data sets by calculating a first probabilistic number of unique entities needed to satisfy a first value of the information with the known distribution, successively calculates a probabilistic incremental number of unique entities needed for a previous value of the information with the known distribution to increase to a subsequent value of the information with the known distribution, until the probabilistic number of unique entities needed to increase to a predetermined value of the information with the known distribution is calculated, and summing the first probabilistic number of unique entities and the probabilistic incremental numbers of unique entities.

5. An apparatus for probabilistic population size and population overlap determination, comprising:
a storage medium storing a database comprising first and second data sets containing records on unique human individuals without unique identifiers for the unique and having at least one common type of information with a known distribution of finite expectation;
a data preparation unit combining the first and second data sets of the database into a combined data set of the database;
a population size measurement unit probabilistically calculating the population size for the first and second data sets of the database using decomposed probabilistic calculations based on values of the information with the known distribution; and,
a population overlap measurement unit determining the population overlap of the unique human individuals between the first and second data sets by subtracting a probabilistic incremental number of unique entities needed for a larger total number of values of the information with the known distribution from either of the first and second data sets to increase to a total number of values of the information with the known distribution in the combined data set from a smaller of the population size of the first and second data sets.

6. An apparatus as recited in claim 5, wherein said population size measurement unit probabilistically calculates the population size of each of the first and second data sets by calculating a first probabilistic number of unique entities needed to satisfy a first value of the information with the known distribution, successively calculating a probabilistic incremental number of unique entities needed for a previous value of the information with the known distribution to increase to a subsequent value of the information with the known distribution, until the probabilistic number of unique entities needed to increase to a predetermined value of the information with the known distribution is calculated, and summing the first probabilistic number of unique entities and the probabilistic incremental numbers of unique entities.

7. An apparatus as recited in claim 5, wherein the known distribution of the information is at least one of a uniform and a non-uniform type.

8. An apparatus as recited in claim 5,
wherein said storage medium stores the first and second data sets containing the records on individuals, and the records have information on gender and birth date for each individual;
wherein said data preparation unit subdivides the records in the first, second, and combined data sets into multiple gender/year of birth cohorts, and determines a total number of unique birth dates in the first, second, and combined data sets for each gender/year of birth cohort;
wherein said population size measurement unit probabilistically calculates the population size for the first and second data sets in each gender/year of birth cohort by calculating a first probabilistic number of individuals needed to fill one birth date, successively calculating a probabilistic incremental number of individuals needed for a previous number of birth dates to increase to a subsequent number of birth dates, until the probabilistic number of unique entities needed to increase to the total number of unique birth dates is calculated, and summing the first probabilistic number of individuals and the probabilistic incremental numbers of individuals;
wherein said population overlap measurement unit determines the population overlap of the individuals between the first and second data sets by subtracting a probabilistic incremental number of individuals needed for a larger total number of unique birth dates from either of the first and second data sets to increase to a total number of unique birth dates in the combined data set from a smaller of the population size of the first and second data sets; and
said apparatus further comprising a total population information generator calculating a total population size and a total population overlap by summing the population size of the first and second data sets and the population overlap across the multiple gender/year of birth cohorts.

9. An apparatus as recited in claim 8, wherein said data preparation unit checks the number of unique birth dates with a maximum number of birth dates and generates a warning when a discrepancy resulting from the check is detected.

10. An apparatus as recited in claim 8,
wherein said population size measurement unit calculates a population size variance corresponding to the population size determined for the first and second data sets for each gender/year of birth cohort;
wherein said population overlap measurement unit calculates a variance corresponding to the probabilistic incremental number of individuals needed for the larger total number of unique birth dates from either of the first and second data sets to increase to the total number of unique birth dates in the combined data set, and calculates lower and upper population overlap variance values corresponding to the population overlap for each gender/year of birth cohort; and
wherein said total population information generator calculates a total population size variance by summing the population size variance for the first and second data sets across the multiple gender/year of birth cohorts, and calculates total lower and upper population overlap variance values by summing the lower and upper population overlap variance values across the multiple gender/year of birth cohorts.

11. An apparatus as recited in claim 10,
wherein said population overlap measurement unit calculates a ninty-five percent confidence interval for the population overlap for each gender/year of birth cohort; and
wherein said total population information generator calculates a ninty-five percent confidence interval for the total population overlap based on the total lower and upper population overlap variance values and eliminating impossible ranges in variance.

12. An apparatus for probabilistic population size and population overlap determination, comprising:
a storage medium storing a database of human individuals in first and second data sets containing records on the individuals without unique identifiers for the individuals and having information on gender and birth date for each individual;
a data preparation unit combining the first and second data sets into a combined data set of the database, subdividing the records in the first, second, and combined data sets into multiple gender/year of birth cohorts, determining a total number of unique birth dates in the first, second, and combined data sets for each gender/year of birth cohort, checking the number of unique birth dates with a maximum number of birth dates, generating a warning when a discrepancy resulting from the check is detected;
a population size measurement unit probabilistically calculating the population size for the first and second data sets of the database in each gender/year of birth cohort of the human individuals and calculating a population size variance corresponding to the population size determined for the first and second data sets for each gender/year of birth cohort, said population size measurement unit probabilistically calculating the population size for the first and second data sets in each gender/year of birth cohort by calculating a first probabilistic number of individuals needed to fill one birth date, successively calculating a probabilistic incremental number of individuals needed for a previous number of birth dates to increase to a subsequent number of birth dates, until the probabilistic number of unique human individuals needed to increase to the total number of unique birth dates is calculated, and summing the first probabilistic number of individuals and the probabilistic incremental numbers of individuals;

a population overlap measurement unit determining the population overlap of the unique human individuals between the first and second data sets by subtracting a probabilistic incremental number of individuals needed for a larger total number of unique birth dates from either of the first and second data sets to increase to a total number of unique birth dates in the combined data set from a smaller of the population size of the first and second data sets, calculating a variance corresponding to the probabilistic incremental number of individuals, calculating lower and upper population overlap variance values corresponding to the population overlap for each gender/year of birth cohort, and calculating a ninety-five percent confidence interval for the population overlap for each gender/year of birth cohort; and, a total population information generator calculating a total population size and a total population overlap by summing the population size of the first and second data sets and the population overlap across the multiple gender/year of birth cohorts, calculating a total population size variance by summing the population size variance for the first and second data sets across the multiple gender/year of birth cohorts, calculating total lower and upper population overlap variance values by summing the lower and upper population overlap variance values across the multiple gender/year of birth cohorts, calculating a ninety-five percent confidence interval for the total population overlap based on the total lower and upper population overlap variance values, and eliminating impossible ranges in variance.

13. An apparatus for probabilistic population overlap determination, comprising:

a storage medium storing a database comprising first and second data sets containing records on the unique human individuals with first unique identifiers for the unique human individuals in the first data set different from second unique identifiers for the unique human individuals in the second data set, and having at least one common type of information with a known distribution of finite expectation; and a computer combining the first and second data sets into a combined data set and determining the population overlap of the unique human individuals between the first and second data sets by subtracting a probabilistic incremental number of unique human individuals needed for a larger total number of values of the information with the known distribution from either of the first and second data sets to increase to a total number of values of the information with the known distribution in the combined data set from a smaller of a population size of the first and second data sets.

14. A method using a computer to probabilistically determine a population size of unique human individuals in data containing records on the unique human individuals without unique identifiers for the unique human individuals and having at least one common type of information with a known distribution of finite expectation, said method comprising decomposing probabilistic calculations based on values of the information with the known distribution.

15. A method as recited in claim 14, wherein said decomposing includes:

calculating a first probabilistic number of unique entities needed to satisfy a first value of the information with the known distribution;

successively calculating a probabilistic incremental number of unique entities needed for a previous value of the information with the known distribution to increase to a subsequent value of the information with the known distribution, until the probabilistic number of unique entities needed to increase to a predetermined value of the information with the known distribution is calculated; and summing the first probabilistic number of unique entities calculated from said calculating and the probabilistic incremental numbers of unique entities calculated from said successively calculating.

16. A method using a computer to probabilistically determine a population size and a population overlap of unique human individuals in first and second data sets containing records on the unique human individuals without unique identifiers for the unique human individuals and having at least one common type of information with a known distribution of finite expectation, said method comprising:

combining the first and second data sets into a combined data set;

decomposing probabilistic calculations based on values of the information with the known distribution to determine the population size for the first and second data sets; and determining the population overlap of unique human individuals between the first and second data sets by subtracting a probabilistic incremental number of unique human individuals needed for a larger total number of values of the information with the known distribution from either of the first and second data sets to increase to a total number of values of the information with the known distribution in the combined data set from a smaller of the population size of the first and second data sets.

17. A method as recited in claim 16, wherein said decomposing for each of the first, second, and combined data sets includes:

calculating a first probabilistic number of unique entities needed to satisfy a first value of the information with the known distribution;

successively calculating a probabilistic incremental number of unique entities needed for a previous value of the information with the known distribution to increase to a subsequent value of the information with the known distribution, until the probabilistic number of unique entities needed to increase to a predetermined value of the information with the known distribution is calculated; and summing the first probabilistic number of unique entities calculated and the probabilistic incremental numbers of unique entities.

18. A method using a computer to probabilistically determine a population size and a population overlap of human individuals in a database comprising first and second data sets containing records on the individuals without unique identifiers for the individuals and having information on gender and birth date for each individual, said method comprising:

combining the first and second data sets into a combined data set of the database;

subdividing the records in the first, second, and combined data sets into multiple gender/year of birth cohorts of the human individuals;

determining a total number of unique birth dates in the first, second, and combined data sets for each gender/year of birth cohort;

decomposing probabilistic calculations based on values of the information with the known distribution to determine the population size for the first and second data sets;

determining the population overlap by subtracting a probabilistic incremental number of individuals needed for a larger total number of unique birth dates from either of the first and second data sets to increase to a total number of unique birth dates in the combined data set from a smaller of the population size of the first and second data sets; and calculating a total population size and a total population overlap by summing the population size of the first and second data sets and the population overlap across the multiple gender/year of birth cohorts.

19. A method as recited in claim 18, wherein said decomposing for each of the first and second data sets includes:

calculating a first probabilistic number of individuals needed to fill one birth date;

successively calculating a probabilistic incremental number of individuals needed for a previous number of birth dates to increase to a subsequent number of birth dates, until the probabilistic number of unique entities needed to increase to the total number of unique birth dates is calculated; and summing the first probabilistic number of individuals and the probabilistic incremental numbers of individuals.

20. A method as recited in claim 18, wherein said determining of the total number of unique birth dates in the first, second, and combined data sets for each gender/year of birth cohort includes:

checking the number of unique birth dates with a maximum number of birth dates; and generating a warning when a discrepancy resulting from said checking is detected.

21. A method as recited in claim 18, wherein said decomposing for each of the first and second data sets further includes calculating a population size variance corresponding to the population size determined for the first and second data sets for each gender/year of birth cohort;

wherein said determining of the population overlap further includes:

calculating a variance corresponding to the probabilistic incremental number of individuals needed for the larger total number of unique birth dates from either of the first and second data sets to increase to the total number of unique birth dates in the combined data set; and calculating lower and upper population overlap variance values corresponding to the population overlap for each gender/year of birth cohort; and wherein said calculating of the total population size and the total population overlap includes:

calculating a total population size variance by summing the population size variance for the first and second data sets across the multiple gender/year of birth cohorts; and calculating total lower and upper population overlap variance values by summing the lower and upper population overlap variance values across the multiple gender/year of birth cohorts.

22. A method as recited in claim 21, wherein said determining of the population overlap further includes calculating a ninty-five percent confidence interval for the population overlap for each gender/year of birth cohort; and wherein said calculating of the total population size and the total population overlap includes calculating a ninty-five percent confidence interval for the total population overlap based on the total lower and upper population overlap variance values and eliminating impossible ranges in variance.

23. A method using a computer to probabilistically determine a population overlap of unique human individuals in a database comprising first and second data sets containing records on the unique human individuals with first unique identifiers for the unique human individuals in the first data set different from second unique identifiers for the unique human individuals in the second data set, and having at least one common type of information with a known distribution of finite expectation, said method comprising:

combining the first and second data sets into a combined data set in the database; and, determining the population overlap of unique human individuals between the first and second data sets by subtracting a probabilistic incremental number of unique human individuals needed for a larger total number of values of the information with the known distribution from either of the first and second data sets to increase to a total number of values of the information with the known distribution in the combined data set from a smaller of a population size of the first and second data sets.

24. A computer program embodied on a computer-readable medium for probabilistically calculating a population size and a population overlap of unique human individuals in a database comprising first and second data sets containing records on the unique human individuals without unique identifiers for the unique human individuals and having at least one common type of information with a known distribution of finite expectation, said computer program comprising:

a data preparation segment combining the first and second data sets into a combined data set in the database;

a population size measurement segment probabilistically calculating the population size for the first and second data sets using decomposed probabilistic calculations based on values of the information with the known distribution; and, a population overlap measurement segment determining the population overlap of the unique human individuals between the first and second data sets by subtracting a probabilistic incremental number of unique human individuals needed for a larger total number of values of the information with the known distribution from either of the first and second data sets to increase to a total number of values of the information with the known distribution in the combined data set from a smaller of the population size of the first and second data sets.

* * * * *

UNITED STATES PATENT AND TRADEMARK OFFICE
CERTIFICATE OF CORRECTION

PATENT NO. : 6,470,298 B1  
DATED : October 22, 2002  
INVENTOR(S) : Steven M. Banks et al.

It is certified that error appears in the above-identified patent and that said Letters Patent is hereby corrected as shown below:

<u>Title page,</u>  
Item [56], References Cited, U.S. PATENT DOCUMENTS, please change "2001/0069620" to -- 2001/0049620 --

Signed and Sealed this

Seventh Day of October, 2003

JAMES E. ROGAN  
*Director of the United States Patent and Trademark Office*